Dec. 22, 1936.　　P. C. KEITH, JR　　2,065,470
PROCESS FOR THE TREATMENT OF HYDROCARBON OIL
Filed Aug. 31, 1934
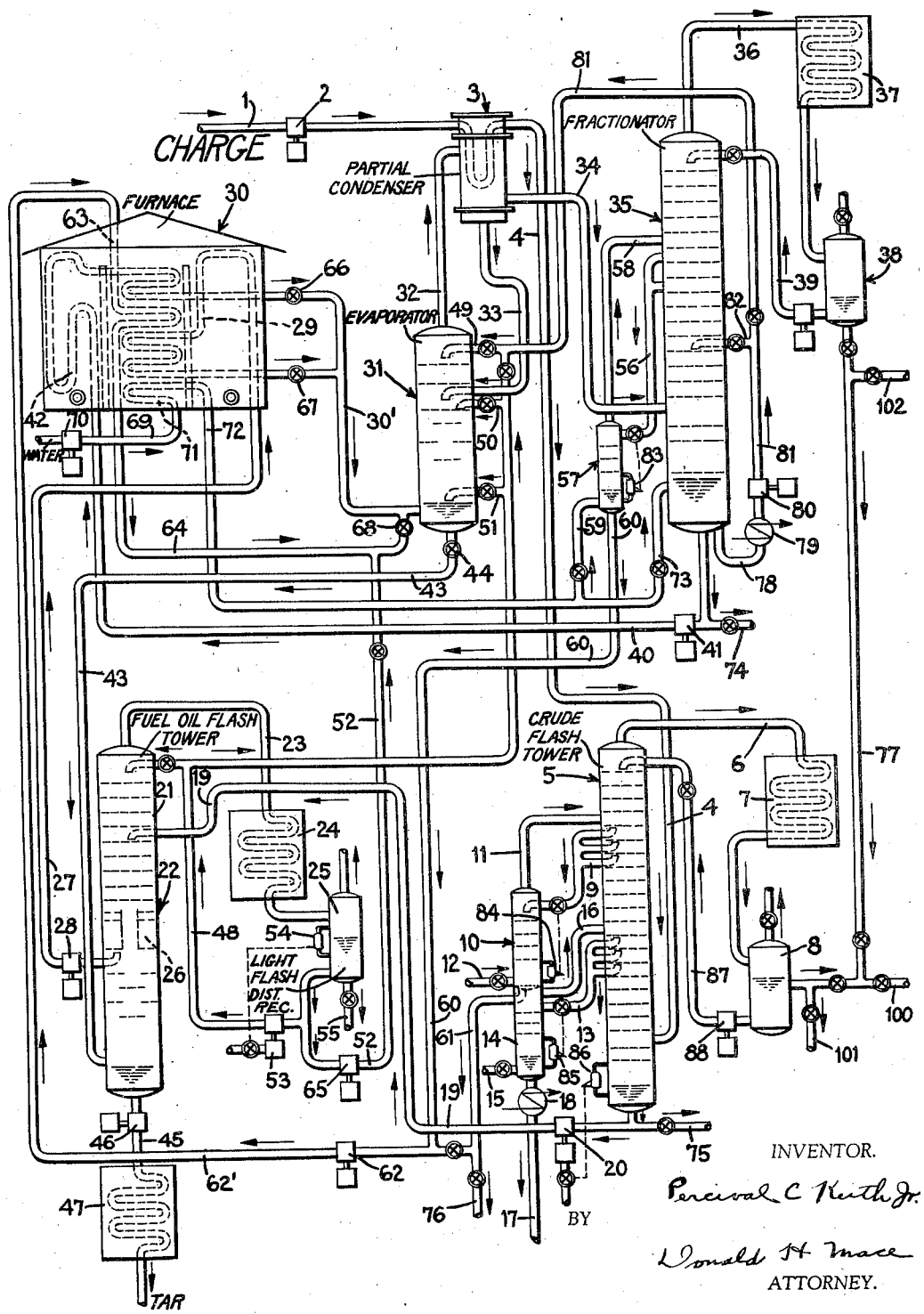
INVENTOR.
Percival C Keith Jr.
BY
Donald H Mace
ATTORNEY.

Patented Dec. 22, 1936

2,065,470

UNITED STATES PATENT OFFICE 2,065,470

PROCESS FOR THE TREATMENT OF HYDROCARBON OIL

Percival C. Keith, Jr., Peapack, N. J., assignor to Gasoline Products Co., Inc., Newark, N. J., a corporation of Delaware Application August 31, 1934, Serial No. 742,238

6 Claims. (Cl. 196—48)

This invention relates to processes for the treatment of hydrocarbon oil and pertains more particularly to processes for the production of gasoline of relatively high anti-knock value, from heavier hydrocarbon oil.

It has been proposed heretofore to subject crude oil to a preliminary distillation in order to separate therefrom a plurality of stock suitable for individual cracking, and to crack these stocks in separate zones to produce constituents falling in the boiling range of the final desired light products, these constituents being subsequently separated by evaporation, either in separate zones or a common zone and the resulting vapors being fractionated to separate the final desired product.

In accordance with the present invention I have devised an improved form of process whereby increased anti-knock value of the final desired product may be obtained efficiently, by recycling a portion of the heavy cracked naphtha, in mixture with straight-run naphtha derived from the crude charging stock, through a reforming zone wherein conversion of the naphtha into relatively high anti-knock gasoline constituents takes place. My improved process also includes other novel steps designed to increase the efficiency of the process as a whole.

In carrying out my improved process, fresh relatively heavy charging stock such as crude petroleum oil, partially reduced crude, or the like, is subjected to a preheating operation in order to raise it to a distilling temperature, and the resulting preheated oil is introduced into a crude stripping zone wherein vapors separate from liquid residue, the latter being reduced crude. The vapors are subjected to fractionation to form straight-run gasoline, heavy virgin naphtha, and, if desired, other intermediate distillate such as straight-run kerosene. The straight-run heavy naphtha is removed and preferably subjected to a stripping operation, for example, by contact with steam, to remove lighter constituents therefrom, and the resulting heavy naphtha is passed through a heating zone wherein it is raised to a reforming temperature of any suitable value, in accordance with the teachings of the prior art, and the reformed products are then introduced into an evaporating zone wherein vapors separate from liquid residue; the vapors are removed and subjected to fractionation in a separate fractionating zone to segregate a final desired gasoline distillate from heavier products. The heavier products are fractionally condensed to form a heavy naphtha condensate and a heavier gas oil condensate. The naphtha condensate is removed and preferably subjected to a stripping operation, for example, by contact with steam, and the stripped naphtha is then combined with the straight-run naphtha for passage through the reforming zone. The heavier gas oil condensate is preferably passed through a separate cracking zone wherein it is subjected to conversion and the resulting cracked products are introduced into the evaporating zone with the reformed naphtha. The topped crude resulting from the preliminary distilling operation is passed through a separate cracking or viscosity breaking zone, preferably after having been further relieved of lighter products by direct contact with vapors from a flashing zone into which liquid residue from the evaporating zone is introduced, and the resulting vis-broken products are introduced into the evaporating zone already mentioned. Light vapors resulting from the fractionation of vapors flashed from the liquid residue removed from the evaporating zone, are condensed and a portion of the resulting condensate may be introduced into the transfer line between the reforming heater and the evaporator, in order to quench the hot reformed products and prevent accumulation of coke in the transfer line. The remainder of the flashed distillate may be introduced into the evaporator or may be used elsewhere in the process as a refluxing medium.

The above-mentioned and further objects and advantages of my invention and the manner of attaining them will be more fully explained in the following description taken in conjunction with the accompanying drawing.

The single figure of the drawing represents diagrammatically an oil cracking system for carrying out my invention.

Referring more particularly to the drawing, reference numeral 1 indicates a charging line through which fresh charging stock, such as crude oil, partially reduced crude or the like, is forced by pump 2. The charging oil flows through the partial condenser 3, which is in the form of an indirect heat exchanger, and is therein preheated by indirect heat exchange with hot vapors, as will be described more fully hereinafter, the preheated charging oil flowing through the line 4 into the lower part of the crude flash tower 5, wherein it undergoes partial vaporization as a result of its contained heat. The vapors pass upwardly through the crude flash tower and are subjected to fractionation therein, the fractionated vapors passing off from the top of the tower through vapor line 6 and condenser 7, the resulting condensate being introduced into the receiver 8. This condensate will be in the nature of straight-run gasoline or, if desired, the lighter constituents of straight-run gasoline. Heavy naphtha condensate, comprising heavier constituents of gasoline, is withdrawn from the tower 5 through line 9 and introduced into a separate stripping zone 10 wherein lighter constituents of the condensate separate as vapors and are preferably returned to the tower 5 by way of vapor line 11. This separation of lighter constituents may be aided, if desired, by the introduction of steam or water into the base of the column 10 through line 12. A heavier condensate, such as kerosene, may be removed from a lower point in the tower 5 through line 13 and be subjected to stripping in tower 14 similarly to the naphtha which is stripped in tower 10. Steam may be introduced into the column 14 through line 15, if desired, and the resulting vapors may be returned to the tower 5 through vapor line 16. The stripped kerosene may then be removed from the process through line 17 having cooler 18.

The topped or reduced crude, freed from lighter constituents, is withdrawn from the base of the tower 5 and passed through line 19, under pressure generated by pump 20, into an intermediate point in the fractionating zone 21 of fuel oil flash tower 22. In this fractionating section the reduced crude is contacted with rising hot vapors from the lower portion of the tower and is thereby subjected to additional partial vaporization, with the resulting removal of lighter constituents as vapors. These vapors pass upwardly through the fractionating section and are subjected to partial condensation therein, the resulting fractionated vapors passing on to line 23 and condenser 24 to form a condensate, which is collected in receiver 25. The unvaporized portions of the reduced crude, in mixture with condensed fractions of the rising vapors, is collected on trap-out tray 26 and forced through conduit 27, by action of pump 28, into the viscosity-breaking coil 29 of furnace 30. In passing through the coil 29 the reduced crude is raised to a cracking temperature and subjected to conversion sufficient to produce a considerable quantity of lighter products suitable for further cracking. The resulting cracked products pass through line 30' into the base of evaporator 31 wherein separation of vapors from liquid residue occurs. The vapors rise upwardly through the evaporator and are therein subjected to partial fractionation, the vapors remaining uncondensed passing off through vapor line 32 into partial condenser 3, wherein they are subjected to partial condensation by indirect heat exchange with the crude charging stock passing through line 1. Resulting partial condensate, consisting of heavy gas oil, is preferably returned to the evaporator 31 through line 33 as a refluxing medium, while the uncondensed vapors pass through line 34 into the base of fractionator 35.

In the fractionator 35 the vapors pass upwardly and are subjected to fractionation in the usual well known manner, by contact with bubble trays or other fractionating elements. The fractionated vapors are removed from the top of the fractionator through vapor line 36 and condenser 37, the resulting condensate being collected in the receiver 38. A portion of the resulting distillate may be pumped back to the top of the fractionator as the refluxing agent, through line 39, if desired. However, other methods of cooling the top of the fractionator may be provided, in accordance with the well known teachings of the prior art.

Reflux condensate formed in the fractionator 35 is forced through line 40, by action of pump 41, into the cracking coil 42 of the furnace 30 and in that coil is raised to a cracking temperature and subjected to conversion, preferably in the vapor phase, and the resulting cracked products are introduced into evaporator 31 through the line 30', or through a seperate transfer line if desired. Liquid residue separated in the evaporator 31 is withdrawn through line 43 having reducing valve 44 and is introduced into the base of the fuel oil flash tower 22, which is held under considerably lower pressure than the evaporator 31, and wherein the liquid residue undergoes partial vaporization by virtue of its contained heat. The released vapors pass upwardly through the tower and are subjected to partial fractionation therein, the vapors, upon reaching a level above the trap-out tray 26, being contacted with the reduced crude introduced through line 19. The unvaporized residue or tar is withdrawn from the base of the fuel oil flash tower through line 45, which may be furnished with pump 46 if necessary. This tar may be reduced in temperature by passing through a cooling coil 47, if necessary. The withdrawn tar may be used for any desired purpose, for example as fuel oil or as a constituent of fuel oil. A portion of the light distillate collected in receiver 25 may be returned to the top of the fuel oil flash tower through line 48, as a refluxing medium, while another portion may be introduced into the evaporator tower 31, through lines 49, and 50 for a similar purpose. A further portion of this flash distillate may be introduced directly into the base of the evaporator tower 31 through line 51, in order to cool the base of the evaporator to the desired temperature so as to prevent coke formation therein. The return of the flash distillate to the fuel oil flash tower and evaporator tower is provided for by pump 53, which is preferably under control of a liquid level responsive device 54. Flash distillate may be diverted from the receiver 25 through line 55 if necessary or desirable, in order to maintain proper control of the process.

A reflux condensate consisting of heavy naphtha and comprising heavier ends of gasoline, is collected in the upper portion of the fractionator 35, and removed therefrom through line 56 which leads to a stripping column 57. In this stripping column lighter constituents of the condensate pass off as vapors through conduit 58, and are preferably returned to the fractionator 35. This partial vaporization may be aided by the introduction of steam through pipe 59. The stripped naphtha is withdrawn through conduit 60, combined with stripped virgin naphtha from column 10, which is withdrawn through pipe 61 and the combination is then forced by action of pump 62, through line 62' into reforming coil 63 of the furnace 30, wherein the naphtha is raised to a temperature sufficient to cause the conversion thereof into gasoline constituents of relatively high anti-knock value, and is subjected to reformation, the resulting reformed products being passed through transfer line 64 into the base of the evaporator 31. A portion of the flash distillate collected in distillate receiver 25 is preferably forced through pipe 52, by action of pump 65, into the transfer line 64, in order to cool the reformed products therein and inhibit the formation of coke in the line.

Reference numerals 66, 67 and 68 indicate control valves for providing any desired pressure reduction between the heating coils of the furnace and the evaporator 31. Steam for stripping purposes may be formed by forcing water through line 69 by action of pump 70, into heating coil 71 located in the furnace 30, resulting steam being passed through conduit 72 directly to the line 59 leading to stripper 57, and if desired to line 73, whereby steam may be admitted into the base of the fractionator 35 to aid in the action thereof. Valved draw-off lines 74 and 75 are furnished for withdrawing reflux condensate from the fractionator 35 or reduced crude from the crude flash tower 5, if desired, in order to obtain balanced operating conditions. A similar line 76 is furnished for diverting a portion of the naphtha from the stripper 10 if necessary. Gasoline distillate from the receiver 38 is most suitably combined with the straight-run gasoline from receiver 8, this blending step being accomplished by way of line 77, the blended gasoline being withdrawn from the process through line 100. If desired the straight-run gasoline may be separately removed through pipe 101 and the cracked gasoline may be separately removed through pipe 102.

Additional refluxing medium for the evaporator 31 and fractionator 35 may be provided by removing a portion of the reflux condensate from the base of the evaporator 35 through conduit 78, passing it through a cooling coil 79 and returning the cooled oil, by action of pump 80, part to the evaporator through line 81, and part to the intermediate portion of the fractionator through line 82. Reference numerals 83, 84 and 85 indicate level responsive mechanisms for controlling the introduction of oil into the several stripping columns 57, 10 and 14 respectively. A similar mechanism 86 is arranged to control the pump 20. Reference numeral 87 indicates a line whereby straight-run gasoline may be pumped back to the top of the crude flash tower 5, by action of pump 88, in order to control the fractionation therein. Various valves shown on the drawing and not specifically indicated by reference numerals are for obvious control purposes.

In the drawing and description hereinbefore the viscosity breaking cracking and reforming coils have been shown as located in a single furnace setting, but these coils might be placed in separate furnaces, not shown, if desired, or two of them might be placed in one furnace and one in another, a particularly desirable arrangement being to have the viscosity breaking coil in one furnace and the reforming and cracking coils in another furnace. If sufficient heat is not picked up by the crude charge in passage through the partial condenser 3 other heat exchange steps with hotter products of cracking may be provided, or the partially preheated charging stock may be passed through a directly fired coil located in the furnace 30 or one of the other furnaces, if several are used, prior to the introduction thereof into the crude flash tower. Soaking drums may be used for some or all of the products from the several heating coils in order to secure additional cracking, a soaking drum being particularly useful in connection with the vapor phase cracking step. Such reaction chambers or soaking drums have not been shown, in order to simplify the drawing.

In an illustrative specific operation the fresh charging stock for the process may be Big Muddy crude of about 33° A. P. I. gravity, this being reduced to a gravity of about 27° A. P. I. by the flashing operation in the crude flash tower. The oil charged to the viscosity breaking cracking coil through line 27 will be considerably heavier, e. g. about 20° A. P. I., while the charge to the cracking coil through line 40 may be about 25° A. P. I. gravity. The heavy naphtha charged to the reforming coil may have a gravity of about 46 A. P. I. The outlet temperature of the viscosity breaking heater may be from 840° to 880° F., preferably about 850° F., while the outlet pressure is suitably in the range of 150 to 300 pounds per square inch, preferably about 260 pounds per square inch. The outlet temperature of the cracking coil may be about 900° to 950° F., while the outlet pressure thereof may be in the neighborhood of 100 to 400 pounds per square inch, preferably about 260 pounds per square inch. The outlet temperature of the reforming coil may be from 950° to 1050° F., preferably about 1000° F., while the outlet pressure of the reforming coil may be several hundred pounds per square inch, for example, preferably about 600 pounds per square inch. The pressure in the evaporator is preferably about the same as the outlet pressure of the cracking coil 42, e. g. 260 pounds per square inch, and the temperatures thereof may be about 820° F. or less, while the pressure in the fuel oil flash tower is considerably lower, e. g. 15 pounds per square inch. Suitable times of contact of the products passing through the viscosity breaking vapor phase cracking and reforming coils should be selected to give the desired amount of conversion per pass through the heating zone. The cracking per pass through the viscosity breaking heater, to products in the gasoline boiling range, may be about 8% to 15%, or even more, 12 per cent per pass being a suitable figure. The cracking per pass in the cracking coil may be from 15% to 25% per pass, more or less, 18% to 20% being a desirable amount. The conversion to relatively high anti-knock gasoline constituents, of the heavy naphtha passing through the reforming coil, may be in the neighborhood of 80% more or less. All of these figures are subject to considerable variation in accordance with the character of the charging stock and the character of the final desired product. Other ranges of temperature and pressure may be used in accordance with the teachings of the prior art in connection with cracking and reforming processes.

While I have described a particular embodiment of my invention for the purposes of illustration it should be understood that various modifications and adaptations thereof may be made within the spirit of the invention as set forth in the appended claims.

I claim:

1. The method of treating hydrocarbon oil which comprises preheating fresh heavy charging stock containing lighter constituents, to a distilling temperature, separating the resulting preheated charging stock, in a distilling zone, into vapors and a liquid residue, fractionally condensing said vapors to form a heavy naphtha condensate, passing said condensate through a reforming zone wherein it is raised to a temperature sufficient to cause the conversion thereof into relatively high anti-knock gasoline constituents, introducing the resulting reformed products into an evaporating zone wherein vapors separate from liquid residue, removing liquid residue from said evaporating zone and introducing it into a zone of reduced pressure wherein vapors separate from liquid residue, withdrawing said residue last mentioned from said zone of reduced pressure, passing said vapors last mentioned to a low pressure fractionating zone wherein heavier constituents thereof are condensed, removing the fractionated vapors and condensing them, introducing reduced heavy charging stock resulting from the distilling operation first mentioned, into said low pressure fractionating zone in contact with the vapors passing therethrough, whereby a portion of said reduced heavy charging stock is vaporized and portions of the vapors from the flashing zone are condensed, removing liquid from the base of said low pressure fractionating zone, comprising condensed portions of the rising vapors and unvaporized portions of the reduced heavy charging stock, passing this mixture through a cracking zone wherein it is raised to a cracking temperature and subjected to conversion, introducing the resulting cracked products into said evaporating zone in mixture with the reformed naphtha, removing vapors from said evaporating zone and introducing them into a high pressure fractionating zone wherein fractionation thereof occurs with the attendant formation of a reflux condensate, removing fractionated vapors from said high pressure fractionating zone and condensing them as a desired product, removing reflux condensate from said fractionating zone and passing it through a second cracking zone wherein it is raised to a cracking temperature and subjected to conversion, introducing the resulting cracked products into said evaporating zone, and removing a heavy naphtha condensate from said high pressure fractionating zone and combining it with the naphtha separated from said heavy charging stock, prior to the passage thereof through said reforming zone.

2. A process in accordance with claim 1 wherein the heavy naphtha condensate removed from the high pressure fractionating zone is stripped of lighter constituents prior to passage through the reforming zone.

3. A process according to claim 1 wherein the vapors removed from said evaporating zone are passed through a partial condensing zone in indirect heat exchange relation with the heavy charging stock, prior to the introduction of the latter into the distilling zone, the resulting partial condensate is returned to the evaporating zone, and the uncondensed vapors are passed to the high pressure fractionating zone.

4. A process in accordance with claim 1 wherein light distillate formed by condensing vapors removed from the low pressure fractionator is combined with the reformed naphtha, subsequent to the removal thereof from the reforming zone and prior to the introduction thereof into the evaporating zone.

5. A process in accordance with claim 1 wherein a kerosene condensate is formed from the heavy charging stock vapors and this condensate is removed from the process.

6. A process in accordance with claim 1 wherein a portion of the light distillate derived from the low pressure fractionating zone is introduced into a low point in said evaporating zone as a cooling medium.

PERCIVAL C. KEITH, Jr.